R. J. DENIO.
CLUTCH.
APPLICATION FILED JULY 13, 1911.
1,043,406.
Patented Nov. 5, 1912.
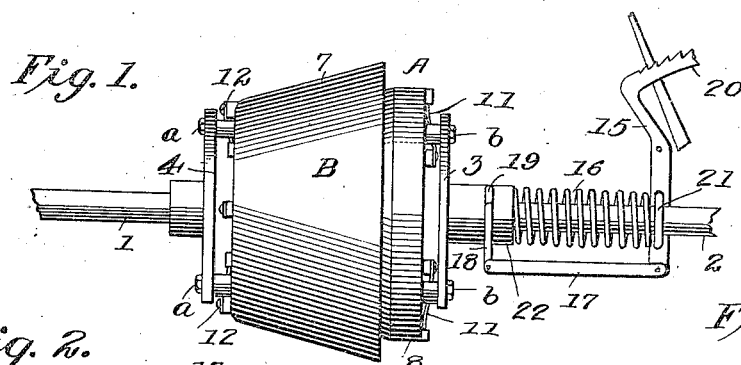
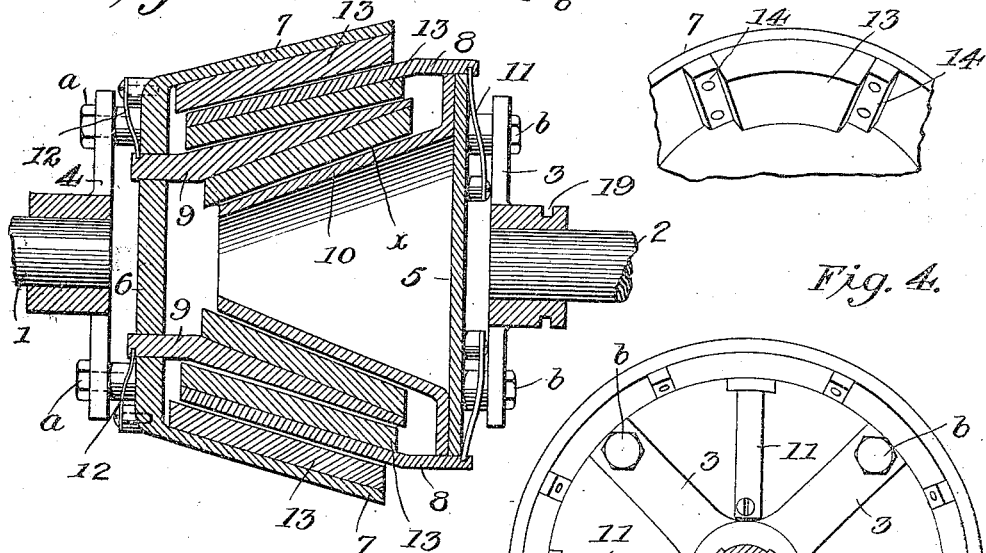
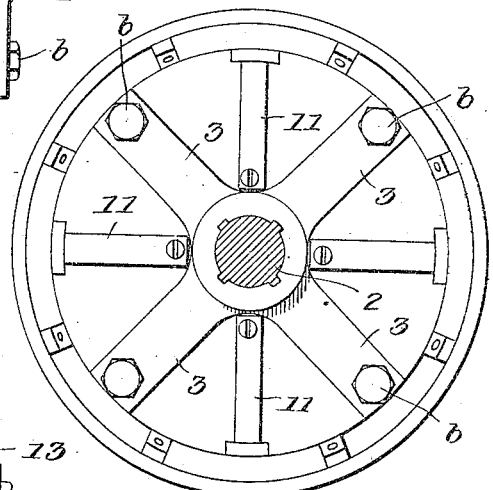
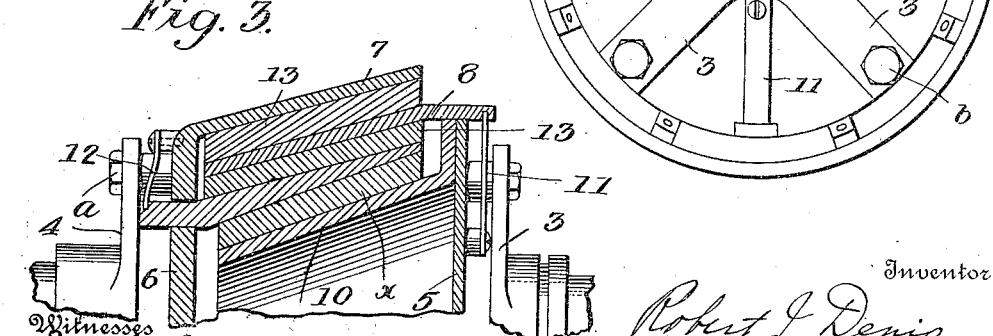
Witnesses
Inventor
Robert J. Denio,
By Spencer B. Trenton,
Attorney

UNITED STATES PATENT OFFICE.

ROBERT J. DENIO, OF KERMAN, CALIFORNIA.

CLUTCH.

1,043,406.  Specification of Letters Patent.  Patented Nov. 5, 1912.

Application filed July 13, 1911. Serial No. 638,405.

*To all whom it may concern:*

Be it known that I, ROBERT J. DENIO, a citizen of the United States, residing at Kerman, in the county of Fresno and State of California, have invented new and useful Improvements in Clutches, of which the following is a specification.

My invention relates to friction clutches for general applications, but is peculiarly adapted for use on automobiles.

The object of the invention is to so arrange the elements of the two main members of a clutch that the driven member will be brought up to speed gradually and smoothly.

A further object is to so mount the clutch members on the shafting, or driving and driven members, that they can be easily and rapidly repaired with the dislocation of a minimum number of parts.

Another object of the invention is the mounting of the inserts upon the friction elements as hereinafter described.

The manner of attaining the above objects will more fully appear from the following description and drawings in which—

Figure 1 is a view of the clutch complete; Fig. 2 is an enlarged section of Fig. 1 unclutched; Fig. 3 is a section of one half the friction elements in the clutched position; Fig. 4 shows the arrangement of the spider and the springs; Fig. 5 shows a friction insert mounted in its element.

In order that the clutch may take hold gently and smoothly it is necessary that the elements be brought into engagement one at a time and this is accomplished, in the present instance, by having some of the elements rigidly mounted and some of them resiliently mounted, some of those which are resiliently mounted being actuated by stronger springs than the others. I have also found it of great convenience and saving to apply friction inserts on one of the friction sides of each element as these inserts can be readily and cheaply replaced after they are worn by use, thereby materially increasing the life of the clutch. I believe that the manner of fastening these inserts to the elements is new.

Referring to the drawings it will be seen that each member of the clutch is composed of a plurality of elements. The driving member B is composed of elements 7 and 9 and the driven member A is composed of elements 8 and 10. In the illustration the element 7 is rigidly mounted on the frame 6 of the driving member B and element 9 is resiliently mounted thereto by means of the springs 12. The element 9 has a reciprocating movement with respect to the frame 6 and is caused to engage with the element 10 by means of the springs 12. As shown, the resiliently mounted element 9 projects through slits in the frame 6 and the springs 12 extend into the grooves made in the projection for that purpose. The element 8 projects out over the top of frame 5 and the springs 11 engage it in the same manner that the springs 12 engage the element 9.

The driven member A is similar in construction to the driving member B. It has a rigidly mounted element 10 and a resiliently mounted element 8. The springs 11 which actuate the element 8 are not as strong as the springs 12 because, in this case, the two are of the same dimensions except the springs 11 are longer than the springs 12, and therefore do not bring the element 8 into effective engagement with the element 7 until after the elements 9 and 10 have been brought together. The fact that elements 9 and 10 contact first and take a majority of the friction causes them to wear more rapidly than any of the other elements. In order that the longitudinal movements of the driven member A upon its shaft 2 shall be a minimum with a given wear the angles of the elements first to engage, that is, element 10 and the inside surface of element 9 are made steeper than the other elements with respect to the shaft 2 thus giving a somewhat increased friction surface and lengthening the life of the inserts $x$.

The inserts $x$ being of the same dimensions as the inserts 13 some idea of the increased steepness of the angle of the element 10 and the inside of the element 9 may be had by noting the difference in thickness of 9 on the left-hand end over that at the right-hand end. The angle of these elements may be of any steepness desired.

It is understood that each member may have as many elements as desired and that two or more may be actuated by springs of the same strength while the others have springs of different strengths or they may all have springs of different strength and further the angle of the face of the elements to the shaft may be different in any number of elements, that is, to say, the angle of the elements first to engage is the largest and the angle of the other elements decreases in the order in which they come into contact.

From the drawings it will be seen that the manner of fastening the clutch members A and B to the shafting is as follows: The supporting element or spider 4, is rigidly secured to the driving shaft, 1, by keys, or any other well-known method, and this disk or spider is then bolted to one of the clutch members by bolts $a$, $a$, as shown in Fig. 1. There is a similar supporting element or spider 3, so mounted on the driven shaft, 2, as to have a longitudinal sliding movement on the shaft 2, but does not revolve thereon. This movement is accomplished by means of long keys on the shaft 2 with corresponding ways in the disk or spider hub, these ways being slightly larger than the keys in order to give an easy action. The respective shafts do not project farther than the inside surface of its corresponding disk or spider when the clutch is in its open position. From this arrangement it is apparent that all that is necessary to do in removing the clutch is to remove the bolts $a$, $a$, on the one side and the bolts $b$, $b$, on the other and the clutch is free to be removed. In other words the ends of the driving and driven shafts 1 and 2, respectively, do not come closer together than the total length of the clutch proper in its closed position. This is a great advantage in any event and particularly when used in automobiles or similar places where access to the shafting, transmission, etc., is difficult.

As shown in Fig. 5 the friction inserts 13, preferably non-metallic, are mounted between two straight pieces 14, which are in turn riveted or otherwise fastened to the clutch elements forming a dovetail socket. This makes a simple and inexpensive, yet satisfactory, holding means for these inserts and allows of easy replacement of the worn ones. Inserts $x$ may be mounted in the same manner.

The operation of the device is as follows: On shaft 2 is a coiled spring 16 the ends of which are held between a fixed collar 21 and the projection 22, of the disk or spider 3. In this projection is cut an annular groove, 19, into which fit the ends of a bifurcated lever 18, which lever is connected through levers 17 and 15 to the operating handle or pedal 20. When pressure is put on this handle or pedal 20 it causes the driven clutch member 3 to be withdrawn and at the same time puts spring 16 under compression. The elements are then as shown in Fig. 2. When the pressure is removed from 20 the spring 16 will force the driven member into engagement with the driving member as follows: The element 10 being rigidly mounted and the element 9 having a stronger spring than any other element, as above described, will cause these two to engage effectively first, then as the driven member speeds up, the engagement of elements 8 and 7 becomes more effective, thus causing the clutch to take hold gently. When the two sets of springs 11 and 12 have been sufficiently compressed, the third or middle set of elements 8 and 9 is brought into contact and the engagement of the clutch is complete, as shown in Fig. 3. Wherever I refer to the order of engagement of the clutch elements I mean primarily the effective engagement, or effective torque, rather than the order of actual contact.

While I prefer to have the elements actually contact in the order mentioned this is not absolutely essential so long as the effective torque of the elements takes place in the proper sequence.

The fact that springs 12 are stronger than springs 11, in this case because they are shorter, all other dimensions being equal, makes the effective engagement of elements 9 and 10 take place before that of any of the other elements and therefore the greater part of the slipping and wear will be between the elements 9 and 10 and for this reason the angle of inclination of these two elements is steeper than that of any of the other elements, as described above. This provision is made so that with a given amount of wear the increment of longitudinal motion of the driven member will be a minimum.

From the foregoing description, taken in connection with the accompanying drawings, it is thought that the construction, mode of operation, and advantages of my improved clutch will be readily apparent without requiring a more extended explanation.

Various changes in the form, proportion, and the minor details of construction may be resorted to without departing from the principle or sacrificing any of the advantages of this invention.

Having thus described my invention, what I claim as new, and desire to secure by Letters Patent, is—

1. In a friction clutch, two members movable one with respect to the other and each comprising a fixed and a spring mounted conical element one within another, the spring mounted element of one member being arranged to engage the fixed element of the other member, the springs of one spring mounted element being stronger than those of the other.

2. In a friction clutch, two members movable one with respect to the other and each comprising a fixed and a spring mounted conical element one within the other, the spring mounted element of one member being arranged to engage the fixed element of the other member, and the inner surface of the outer spring mounted element engaging the outer surface of the inner spring mounted element when the springs are sufficiently compressed.

3. In a friction clutch, two members movable one with respect to the other and each comprising a fixed and a spring mounted conical element one within the other, the spring mounted element of one member being arranged to engage the fixed element of the other member and also said spring mounted elements to engage each other, the springs of the inner spring mounted element being stronger than those of the other spring mounted element.

4. In a friction clutch, a plurality of pairs of conical elements, one pair having a steeper angle to the axis than the others and arranged to exert the greatest initial torque.

5. In a friction clutch, a plurality of pairs of conical elements, one pair having a steeper angle to the axis than the others and arranged to exert the greatest torque and be subject to the greatest wear.

6. In a friction clutch, a plurality of conical elements which are concentric to each other, some of which are spring actuated, the springs for actuating some of said elements being stronger than the springs for actuating others of said elements.

7. In a friction clutch, a plurality of pairs of conical elements which are concentric, one element of each pair spring actuated, one pair having a steeper angle to the axis than the others and its spring actuated element having the strongest springs.

8. In a friction clutch, a plurality of members having pairs of conical friction surfaces one within another, with apices in the same direction, one of said pairs of surfaces having a steeper angle to the axis of revolution than the others.

9. In a friction clutch, two members each having a plurality of concentric conical elements, one element at least of each member being rigidly mounted, the others of said elements being spring actuated.

10. In a friction clutch, two members movable one with respect to the other and each comprising a fixed and a yieldingly mounted conical element one within the other, the yieldingly mounted element of one member being arranged to engage the fixed element of the other member thus constituting pairs of engaging surfaces, one of said pairs of surfaces having a greater angle of inclination to the axis than the other, and means for moving one of said members to cause the engagement of said pairs of surfaces.

11. In a friction clutch, a plurality of coöperative members having inserts mounted thereon, the inserts being mounted between two separate pieces each fastened to its respective member by separate means.

12. In a friction clutch, a driving member and shaft and a driven member and shaft, each member separately mounted on its respective shaft, the ends of the said shafts being farther apart than the total length of the clutch when open, and means for moving one of said members to cause the opening and closing of the clutch.

13. In a friction clutch, a driving member and shaft and a driven member and shaft, a supporting element on the end of each shaft upon which each member is detachably mounted, the distance between said supporting elements being greater than the total length of the clutch, and means for moving one of said members to cause the opening and closing of the clutch.

In testimony whereof I have hereunto set my hand in presence of two subscribing witnesses.

ROBERT J. DENIO.

Witnesses:
R. N. BARSTOW,
W. W. SARGENT.